US011631837B2

(12) United States Patent
Boschini et al.

(10) Patent No.: US 11,631,837 B2
(45) Date of Patent: Apr. 18, 2023

(54) FLEXIBLE THIN-FILMS FOR BATTERY ELECTRODES

(71) Applicant: UNIVERSITÉ DE LIÈGE, Liège (BE)

(72) Inventors: Frédéric Boschini, Rocourt (BE); Caroline Piffet, Soumagne (BE); Rudi Cloots, Hélécine (BE)

(73) Assignee: UNIVERSITÉ DE LIÈGE, Liège (BE)

( * ) Notice: Subject to any disclaimer, the term of this patent is extended or adjusted under 35 U.S.C. 154(b) by 130 days.

(21) Appl. No.: 16/482,570

(22) PCT Filed: Jan. 29, 2018

(86) PCT No.: PCT/EP2018/052028
§ 371 (c)(1),
(2) Date: Jul. 31, 2019

(87) PCT Pub. No.: WO2018/141659
PCT Pub. Date: Aug. 9, 2018

(65) Prior Publication Data
US 2020/0035985 A1   Jan. 30, 2020

(30) Foreign Application Priority Data
Jan. 31, 2017   (EP) .................................... 17153943

(51) Int. Cl.
*H01M 4/04* (2006.01)
*H01M 4/62* (2006.01)
(Continued)

(52) U.S. Cl.
CPC ....... *H01M 4/0402* (2013.01); *H01M 4/0457* (2013.01); *H01M 4/622* (2013.01);
(Continued)

(58) Field of Classification Search
CPC .................................................... H01M 4/622
See application file for complete search history.

(56) References Cited

U.S. PATENT DOCUMENTS 2,995,548 A * 8/1961 Bristol ...................... C08F 8/12
525/62
6,919,143 B2 7/2005 Hwang et al.
(Continued)

FOREIGN PATENT DOCUMENTS

EP       0316380 A1    5/1989
JP     H07326349 A    12/1995
(Continued)

OTHER PUBLICATIONS

Komaba, et al., Journal of Physical Chemistry C, 2011, vol. 115, pp. 13487-13495 (Year: 2011).*
(Continued)

*Primary Examiner* — Sadie White
(74) *Attorney, Agent, or Firm* — Workman Nydegger

(57) ABSTRACT

A composition comprises: an at least partially hydrolysed polyvinyl acetate component having an hydrolysation degree of at least 5%; a polyalkylene glycol component having a number average molecular mass Mn lower than 9000 g/mol and consisting of one or more substances selected from the group consisting of polyethylene glycol, polypropylene glycol, copolymers of ethylene glycol and propylene glycol, and their derivatives; a positive or negative electrode active component; and a conductive component; wherein the mass ratio between the at least partially hydrolysed polyvinyl acetate component and the positive or negative electrode active component equals at least 0.12 and at most 0.30, and wherein the mass ratio between the polyalkylene glycol component and the positive or negative electrode active component equals at least 0.012 and at most 0.10.

12 Claims, 2 Drawing Sheets

(51) Int. Cl.
*H01M 10/052* (2010.01)
*H01M 8/0223* (2016.01)
*H01M 10/05* (2010.01)
*H01M 4/13* (2010.01)
*H01M 4/02* (2006.01)

(52) U.S. Cl.
CPC ......... *H01M 8/0223* (2013.01); *H01M 10/05* (2013.01); *H01M 10/052* (2013.01); *H01M 4/13* (2013.01); *H01M 4/625* (2013.01); *H01M 2004/021* (2013.01)

(56) References Cited

U.S. PATENT DOCUMENTS

| | | | |
|---|---|---|---|
| 2001/0026890 A1* | 10/2001 | Ono | H01M 10/0565 429/189 |
| 2002/0039680 A1 | 4/2002 | Hwang et al. | |
| 2002/0050054 A1* | 5/2002 | Noh | H01M 10/058 29/623.3 |
| 2003/0118904 A1* | 6/2003 | Hosokawa | H01M 4/13 429/217 |
| 2004/0058246 A1* | 3/2004 | Choi | H01M 4/136 429/231.95 |
| 2004/0062989 A1* | 4/2004 | Ueno | H01M 4/622 264/319 |
| 2004/0127417 A1* | 7/2004 | Finn | A61P 5/06 514/5.1 |
| 2005/0048367 A1* | 3/2005 | Igaki | H01M 10/0525 429/212 |
| 2006/0068272 A1* | 3/2006 | Takami | H01M 4/525 429/62 |
| 2007/0264568 A1* | 11/2007 | Ryu | H01M 4/621 429/213 |
| 2007/0264570 A1* | 11/2007 | Oh | H01M 4/139 429/217 |
| 2012/0107690 A1* | 5/2012 | Wakizaka | H01M 4/32 429/217 |
| 2013/0034769 A1* | 2/2013 | Takagi | B32B 27/32 429/144 |
| 2013/0059174 A1* | 3/2013 | Zhamu | H01M 4/625 429/300 |
| 2014/0186694 A1* | 7/2014 | Jiang | H01M 4/0404 429/188 |
| 2015/0050554 A1* | 2/2015 | Fukumine | H01M 4/0404 429/217 |
| 2015/0118551 A1* | 4/2015 | Oshima | H01M 4/366 429/212 |

FOREIGN PATENT DOCUMENTS

| | | |
|---|---|---|
| JP | H09306503 A | 11/1997 |
| JP | 2000012006 A | 1/2000 |
| JP | 2002110237 A | 4/2002 |
| JP | 2010029608 A | 2/2010 |
| JP | 2014194001 A | 10/2014 |
| JP | 2015225761 A | 12/2015 |

OTHER PUBLICATIONS

Park, et al., Electrochemistry Communications, 2011, vol. 13, pp. 1051-1053 (Year: 2011).*
Porcher, et al., Journal of the Electrochemical Society, 2009, vol. 156, A133-A134 (Year: 2009).*
Prosini, et al., Electrochemica Acta, 2014, vol. 150, pp. 129-135 (Year: 2014).*
Porcher, et al., Journal of Power Sources, 2010, vol. 195, pp. 2835-2843 (Year: 2010).*
Porcher et al., "Optimizing the surfactant for the aqueous processing of LiFePO4 composite electrodes", Journal of Power Sources, 2010, vol. 195, pp. 2835-2843.
Fongy et al., "Toward the Aqueous Processing of Li4Ti5O12: A Comparative Study with LiFePO4", Journal of the Electrochemical Society, 2012, vol. 159, No. 7, pp. A1083-A1090.
Tran et al., "Adhesive PEG-based binder for aqueous fabrication of thick Li4Ti5O12 electrode", Electrochimica Acta, 2013, vol. 88, pp. 536-542.
Prosini et al., "Poly vinyl acetate used as a binder for the fabrication of a LiFePO4-based composite cathode for lithium-ion batteries" Electrochimica Acta, 2014, vol. 150, pp. 129-135.
Zhou et al., "Progress in flexible lithium batteries and future prospects", Energy and Environmental Science, Apr. 2014, vol. 7, 1307-1338.
European Search Report from EP Application No. 17153943, dated Mar. 30, 2017.
International Search Report from PCT Application No. PCT/EP2018/052028, dated Feb. 26, 2018.
Office Action from corresponding Chinese application No. 2019-531448, dated Apr. 8, 2021.

* cited by examiner

FLEXIBLE THIN-FILMS FOR BATTERY ELECTRODES

TECHNICAL FIELD OF THE INVENTION

The present invention relates to compositions for forming films for battery electrodes, and in particular to aqueous suspensions for forming thin-films for Li-ion or Na-ion battery electrodes.

BACKGROUND OF THE INVENTION

With the development of the use of portable electronic gadgets, there is an increasing need for high-performance energy storage devices and in particular efficient lithium-ion batteries, which currently dominate the portable device market.

Presently, the majority of available batteries have a well-defined and rigid shape. This rigid shape constitutes a hindrance to the development of performant flexible technologies such as smart textiles, flexible smartphones, connected wristbands, watches, etc. This is why scientists brought their attention to thin, light and flexible lithium-ion batteries (Zhou et al., Energy and Environmental Science, 2014, 7, 1307-1338).

Currently, the preparation of flexible electrodes is typically performed in several steps: first, the active material is formed via any suitable method such as solid-state, spray-drying, sol-gel, hydro/solvothermal, self-combustion, etc.; second, a suspension containing an organic solvent, the active material, conductive additives, binder(s) and/or stabilizer(s), is prepared; third, the suspension is deposited on a substrate by any existing suitable technology such as a tape-casting method, an aerosol deposition, an ink-jet printing, etc.; fourth, the electrode is optionally pressed before electrochemical measurements.

The solvent used to produce suspensions for electrochemical applications is generally N-methylpyrrolidinone but it is toxic and non-environmentally friendly. To be more environmentally friendly, some researchers have reported procedures in water. For instance, Porcher et al. (Journal of Power Sources 2010, 195, 2835) describes the aqueous processing of $LiFePO_4$. For this purpose, Porcher et al. prepared aqueous suspensions comprising $LiFePO_4$ as the electrode active component, carbon black as the conductive component, deionized water, one of sodium dodecyl sulfate, the isooctylphenyether of polyoxyethylene, and hexadecyltrimethylammonium bromide as the surfactant, one of hexadecyltrimethylammonium bromide, poly(vinylidene fluoride), and a mix of polyvinyl alcohol (PVA) and polyethylene glycol (PEG), as the binder, and a cellulose derivative serving as a thickener. After deposition by tape casting on an aluminium current collector, the composition was dried, then pressed under 2 tons cm', followed by a further drying at 80° C. under vacuum and battery assembly. Porcher et al. reported the rheological behavior of the carbon suspension with different surfactants but no results were shown for the rheological behavior of the suspension containing carbon and the active material. Their best results were achieved with non-ionic surfactant Triton X-100. The deposition of this suspension resulted in a non-homogenous electrode with a segregation of $LiFePO_4$ and carbon. No flexibility for this system was reported. Other researchers also reported this problem of inhomogeneity in aqueous media (Fongy et al., Journal of the Electrochemical Society, 2012, 159, A1083-A1090). Fongy et al. also used Triton X-100 but in combination with carboxymethyl cellulose and butadiene-acrylonitrile rubber latex to disperse a mixture of carbon and $Li_4Ti_5O_{12}$. The preparation of the electrode was here also done by tape-casting of the suspension, followed by a pressing step. The electrode obtained was also not homogenous and particles were aggregated. Moreover, the resulting electrode was not flexible. Furthermore, in the experience of the inventors, compositions based on the use of a cellulose derivative are in general relatively brittle and lacking enough flexibility, they easily exhibit cracks and show a less than adequate encapsulation of the conductive component and the electrode active component.

Another approach toward working in aqueous media was followed by Prosini et al. (Electrochimica Acta, 2014, 150, 129-135). Prosini et al. used a polyvinylacetate (PVAc) as a binder. The results showed inhomogeneous electrode surfaces. Moreover, their electrode was not flexible.

In Tran et al. (Electrochimica Acta, 2013, 88, 536-542), aqueous slurries containing $Li_4Ti_5O_{12}$, carbon and a PEG-based copolymer were prepared and the suspensions were tape-casted on a nickel-foam substrate and then pressed. The foam constitutes the skeleton of the film and without this architecture, their film would not be flexible, i.e. it is not intrinsically flexible. Moreover, the films contain cracks which weaken their mechanical strength.

Ideally however, to expand and facilitate their use, active films for battery electrodes should preferably display good intrinsic flexibility, homogeneity, electrochemical performances, few or no cracks and good encapsulation properties. There is therefore still a need in the art for compositions for the formation of films for electrochemical applications, overcoming one or more of the drawbacks of the prior art.

SUMMARY OF THE INVENTION

It is an object of the present invention to provide good compositions suitable for forming films for battery electrodes.

In a first aspect, the present invention relates to a composition comprising:
  a. An at least partially hydrolysed polyvinyl acetate component having an hydrolysation degree of at least 5%,
  b. A polyalkylene glycol component having a number average molecular mass Mn lower than 9000 g/mol and consisting of one or more substances selected from the group consisting of polyethylene glycol, polypropylene glycol, copolymers of ethylene glycol and propylene glycol, and their esters.
  c. a positive or negative electrode active component, and
  d. a conductive component,
wherein the mass ratio between the at least partially hydrolysed polyvinyl acetate component and the positive or negative electrode active component equal at least 0.12 and at most 0.30, and
wherein the mass ratio between the polyalkylene glycol component and the positive or negative electrode active component equal at least 0.012 and at most 0.10.

By virtue of the solvents (e.g. water) with which these compositions are compatible, they present the advantage of having a relatively low toxicity, a relatively low impact on the environment and are relatively inexpensive.

In a second aspect, the present invention relates to a liquid suspension comprising:
  a) One or more solvents selected from water, methanol, ethanol, and propanol, and
  b) A composition according to any embodiment of the first aspect.

Liquid suspensions according to the second aspect of the present invention may present one or more of the following advantages:
- They can be aqueous and/or contain short alcohols of relatively low toxicity, making the suspensions environmentally friendly and cheap,
- They may be shear thinning, thereby allowing an easy and homogeneous deposition,
- They may have a low viscosity, permitting easy deposition and even spraying, which is one of the preferred industrial deposition processes, and
- They may be stable up to a temperature of 100° C. in the case of an aqueous suspension comprising only water as solvent.

In a third aspect, the present invention relates to a method for forming a liquid suspension according to any embodiment of the second aspect, comprising contacting one or more solvents selected from water, methanol, ethanol, and propanol with each component of a composition according to any embodiment of the first aspect.

Methods according to the third aspect of the present invention may present one or more of the following advantages:
- They may be easy to perform, and
- They may allow the formation of a liquid suspension without degradation of the electroactive material and its electrochemical performances.

In a fourth aspect, the present invention relates to a film having a composition according to any embodiment of the first aspect.

Films according to the fourth aspect of the present invention may present one or more of the following advantages:
- Their flexibility may be tunable and they can be intrinsically flexible,
- Their thickness may be tunable and they can be thin,
- They may be homogeneous, i.e. the different compounds in the film may be homogenously dispersed both across the surface of the film and across its depth, thereby allowing good electrochemical performances, such as rate capability and conductivity,
- They may be crack-free,
- They may be mechanically resistant and may be foldable without cracking,
- They may be intrinsically mechanically resistant, in absence of a substrate
- They may display few or no aggregation of the electrode active material, and
- They may be rich in electrode active material, thereby permitting light films having good electrochemical properties.

In a fifth aspect, the present invention relates to a process for forming a film according to any embodiment of the fourth aspect, comprising applying a liquid suspension according to any embodiment of the second aspect on a substrate.

Processes according to the fifth aspect of the present invention may present one or more of the following advantages:
- They may be easy to perform,
- They may allow the formation of a film without degradation of the electroactive material and its electrochemical performances,
- They may be performed without requiring a pressing of the film, thereby saving time and energy by forming a film which is directly ready to use upon drying.

In a sixth aspect, the present invention relates to an electrode comprising a film according to any embodiment of the fourth aspect.

Electrodes according to the sixth aspect of the present invention may present one or more of the following advantages:
- They may be flexible by virtue of the flexibility of the film they comprise,
- They may show good electrochemical performances such as good rate capability, good conductivity and/or good capacity,
- They may be light by virtue of the high active material concentration in the film they comprise.

In a seventh aspect, the present invention relates to a battery comprising an electrode according to any embodiment of the sixth aspect.

Batteries according to the seventh aspect of the present invention may present one or more of the following advantages:
- They may be efficient,
- They may show good electrochemical performances such as good rate capability, good conductivity and/or good capacity,
- They may be light by virtue of the high active material concentration in the film.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 3 (c, d) shows SEM pictures of a film cross-section at different magnitude according to comparative example 2 (c, d).

DESCRIPTION OF ILLUSTRATIVE EMBODIMENTS

Figure 1:
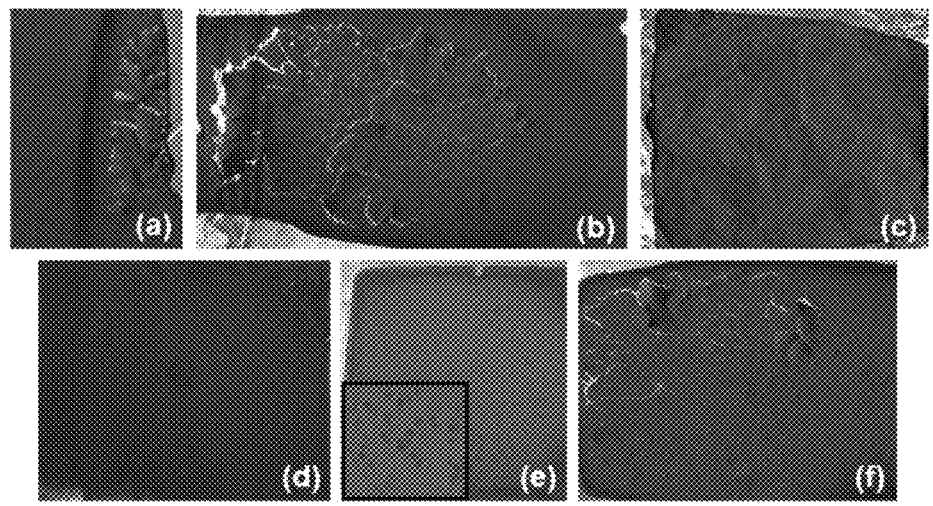
FIG. 1 shows pictures of films according to comparative examples (a=comparative example 1; b=comparative example 3; e=comparative example 10, inset in e=zoom; f=comparative example 11) and according to embodiments of the present invention (c=embodiment example 4, d=embodiment example 8).

The present invention will be described with respect to particular embodiments and with reference to certain drawings but the invention is not limited thereto but only by the claims. The drawings described are non-limiting.

Furthermore, the terms first, second, third and the like in the description and/or in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a composition comprising elements A and B" should not be interpreted as being limited in scope to compositions consisting only of components A and B. It means that with respect to the present invention, the only relevant elements of the composition are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures, and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a composition comprising:
a. An at least partially hydrolysed polyvinyl acetate component having an hydrolysation degree of at least 5%,
b. A polyalkylene glycol component having a number average molecular mass Mn lower than 9000 g/mol and consisting of one or more substances selected from the group consisting of polyethylene glycol, polypropylene glycol, copolymers of ethylene glycol and propylene glycol, and their derivatives,
c. a positive or negative electrode active component, and
d. a conductive component,
wherein the mass ratio between the at least partially hydrolysed polyvinyl acetate component and the positive or negative electrode active component equal at least 0.12 and at most 0.30, and
wherein the mass ratio between the polyalkylene glycol component and the positive or negative electrode active component equal at least 0.012 and at most 0.10.

The composition can be a dry composition in the form of a powder or a film, or it can be a liquid composition such as a liquid suspension. If the composition is a dry composition in the form of a powder, one of its purposes can be to serve as basis for forming a liquid composition, which in turn can be used to form a film. Another use of the dry composition in the form of a powder is to form a film thereof by pressing it directly against the (counter-)electrode. The dry composition in the form of a powder is lighter and therefore cheaper to ship than a liquid composition. The liquid composition has the advantage to be ready for use for the formation of a film. The liquid composition is preferably an aqueous composition but it can be a composition comprising water, methanol, ethanol, propanol or a mixture thereof. Preferably, it comprises water and more preferably its only solvent is water. The composition of the first aspect, when it is a dry composition in the form of a powder, is typically suitable for forming an aqueous suspension.

The at least partially hydrolysed polyvinyl acetate component having an hydrolysation degree of at least 5% can be composed of a single partially hydrolysed polyvinyl acetate polymer or of a mixture of partially hydrolysed polyvinyl acetate polymers. Although it is the at least partially hydrolysed polyvinyl acetate component which must have an hydrolysation degree of at least 5%, it is nevertheless preferred if each of the at least partially hydrolysed polyvinyl acetate polymer composing the at least partially hydrolysed polyvinyl acetate component has an hydrolysation degree of at least 5%. This ensures that the whole component will be soluble in a solvent or solvent mixture composed of one or more solvents selected from water, methanol, ethanol, and propanol.

The hydrolysation degree is a molar percentage representing the percentage of acetate groups replaced by hydroxyl groups. It can, for instance, be measured by NMR.

The hydrolysation degree of the at least partially hydrolysed polyvinyl acetate component is preferably from 5% to 99%, more preferably from 40 to 99%. In embodiments, the hydrolysation degree of the at least partially hydrolysed polyvinyl acetate component may be from 50 to 95%, from 60 to 85%, from 65 to 80% or from 70 to 75%. The weight average molecular mass of the at least partially hydrolysed polyvinyl acetate component may be from 15000 to 450000 g/mol, preferably from 30000 to 250000 g/mol, yet more preferably from 50000 to 200000 g/mol, yet more preferably from 75000 to 165000 g/mol. These molecular masses are measured by measuring the corresponding non-hydrolysed polyvinylacetate by GPC by using PS standard. In embodiments, the Tg of the at least partially hydrolysed polyvinyl acetate component may be from 30 to 100° C., preferably from 40 to 85° C. as measured by DSC. The at least partially hydrolysed polyvinyl acetate component is typically entirely water soluble. It is also usually soluble in methanol, ethanol, propanol or a mixture of any of water, methanol, ethanol, and propanol.

The polyalkylene glycol component consists of one or more substances selected from the group consisting of polyethylene glycol, polypropylene glycol, copolymers of ethylene glycol and propylene glycol, and their derivatives. Examples of derivatives of polyethylene glycol, polypropylene glycol, and copolymers of ethylene glycol and propylene glycol are their esters, amides, and ethers. Preferably, the derivatives of polyethylene glycol, polypropylene glycol, and copolymers of ethylene glycol and propylene glycol comprise at least 90 wt % of ethylene oxide and propylene oxide units with respect to the total mass of the derivatives. Derivatives of polyethylene glycol, polypropylene glycol, and copolymers of ethylene glycol and propylene glycol are preferably end-capped derivatives thereof. By polyethylene glycol and polypropylene glycol, it is meant homopolymers or homo-oligomers of ethylene glycol or propylene glycol respectively. Preferably, the polyalkylene glycol component consists of one or more substances selected from the group consisting of polyethylene glycol, polypropylene glycol, copolymers of ethylene glycol and propylene glycol. The polyalkylene glycol component can be composed of a single polyalkylene glycol polymer or oligomer, of a mixture of polyalkylene glycol polymers, of a mixture of polyalkylene glycol oligomers or of a mixture of one or more polyalkylene glycol oligomers and one or more polyalkylene glycol polymers. Each polyalkylene glycol polymer or oligomer forming the component may be selected from polyethylene glycol, polypropylene glycols, and poly(ethylene glycol-co-propylene glycol). Preferably, the polyalkylene glycol component is a polyethylene glycol, i.e. is composed only of polyethylene glycols. More preferably, it is composed of a single polyethylene glycol oligomer or polymer. The polyalkylene glycol component has a number average molecular mass Mn lower than 9000 g/mol, preferably from 200 to 9000 g/mol, more preferably from 300 to 8000 g/mol, yet more preferably from 400 to 7000 g/mol. Although it is the polyalkylene glycol component which must have a molecular mass Mn lower than 9000 g/mol, it is nevertheless preferred if each of the substances entering in the composition of the polyalkylene glycol component has a number average molecular mass Mn lower than 9000 g/mol. These molecular masses are measured by GPC by using PS standard.

In embodiments, the Tg of the polyalkylene glycol component may be from −90° C. to 20° C., preferably from −80° C. to 0° C., yet more preferably from −70° C. to −10° C. as measure by DSC.

The polyalkylene glycol component is typically entirely water soluble. It is also usually soluble in methanol, ethanol, propanol or a mixture of any of water, methanol, ethanol, and propanol.

The polyalkylene glycol component and the at least partially hydrolysed polyvinyl acetate component are typically soluble in the same solvent.

The polyalkylene glycol component interacts with the at least partially hydrolysed polyvinyl acetate component to lower the viscosity of the suspension based on the composition and to make the films having that composition flexible and crack-free. Another advantage of the presence of a polyalkylene glycol in the composition is the fact that a promising candidate for solid electrolytes in Li-ion batteries is based on polyethylene glycol. A good compatibility is therefore expected between such an electrolyte and films of the present invention.

In embodiments, the at least partially hydrolysed polyvinyl acetate component may have a glass transition temperature higher than a glass transition temperature of the polyalkylene glycol component.

The positive or negative electrode component is either a single positive or negative electrode active material, a mixture of positive electrode active materials, or a mixture of negative electrode active materials.

The term "electrode active material," as used herein, refers to any material capable of taking up and/or releasing ions and electrons during operation of the cell. The term "positive electrode active material" is used to refer to electrode active materials associated with the positive electrode, while the term "negative electrode active material" is used to refer to electrode active materials associated with the negative electrode. It should be understood that, as used herein, an electrode active material is not the same as an electrolyte. The term "electrolyte" is used herein to refer to a material that does not itself take up or release ions, but rather, facilitates transport of ions to and/or from electrode active material contained within the electrolyte to other parts of the electrochemical cell. Furthermore, the electrode active materials do not include conductive materials that are added to facilitate the transport of electrons from an electrode current collector to the electrode active material (i.e., additional materials that increase the electronic conductivity).

In embodiments, the positive or negative electrode active component may consist of particles having an average size inferior to 10 µm, preferably inferior to 5 µm, more preferably inferior to 2 µm, yet more preferably inferior to 1 µm. For instance, the average size of the particles may be from 200 nm to 1 µm or from 400 nm to 800 nm. This average size can be evaluated by granulometry, such as by laser diffraction granulometry with a laser diffraction particle sizer, by measuring d0.5, i.e. the size below which 50% of the particles lies; it can also be measured by microscopy (e.g. SEM).

The electrode active material may be any electrode active material.

In the case of a Li-ion battery, the negative electrode active materials may, for instance, be selected from lithium metal; crystalline carbon materials such as graphite and artificial graphite, carbon nanotubes, graphene or a mixed of them; alloys consisting of the combination of one or more elements selected from Sn, Sb, P, Ge, Bi and one or more elements selected from V, Fe, Mn, Ni, Co, and Ti; metal oxides or sulphides wherein the metal is selected from Fe, Co, Ni, Cu, Mn and Mo; Titanium based compounds such as $Li_4Ti_5O_{12}$ and $TiO_2$; and metal carbodiimides or cyanamides wherein the metal is selected from V, Fe, Mn, Ni, Co, Ti or a combination of these metals.

In the case of a Li-ion battery, the positive electrode active materials may, for instance, be selected from phosphates such as $LiFePO_4$; $Li_xM_y(PO_4)_zF_n$ with (M=V, Fe, Mn, Ni, Co, Ti or combination of these metals); transition metal layered oxides of the formula $Li_xMO_2$ wherein M=Mn, Co, Fe, Ni, Ti, Mg, B, Cr, Al, Sb or combination of these metals; $LiMnO_2$; $LiMn_2O_4$; $LiMn_{2-x}M_yO_4$ (where $0 \leq x \leq 2$, $0 \leq y \leq 2$, 0≤x+y≤2, M=for example Br, Co, Fe, Ni, Al, Si or Zn); $LiNi_{1-x-y}Co_xM_yO_2$ (where, 0≤x≤1, 0≤y≤1, 0≤x+y≤1, M is Al, Sr, Mg or La).

In the case of a Na-ion battery, the negative electrode active materials may, for instance, be selected from crystalline carbon materials such as non-graphitizable carbon (also called hard carbon), graphite and artificial graphite, and amorphous carbon materials; alloys consisting of the combination of one or more elements selected from Sn, Sb, P, Ge, Bi and one or more elements selected from V, Fe, Mn, Ni, Co, and Ti; metal oxides or sulphides wherein the metal is selected from Fe, Co, Ni, Cu, Mn, and Mo; Titanium based compounds such as $Na_4Ti_5O_{12}$, $Na_2Ti_3O_7$ and $TiO_2$ (e.g. $Na_4Ti_5O_{12}$ or $TiO_2$); and metal carbodiimides or cyanamides wherein the metal is selected from V, Fe, Mn, Ni, Co, Ti or a combination of these metals.

In the case of a Na-ion battery, the positive electrode active materials may, for instance, be selected from phosphates such as $NaFePO_4$ or $Na_3V_2(PO_4)_3$; pyrophosphates such as $Na_2MP_2O_7$, $Na_4M_3(PO_4)_2P_2O_7)$, $Na_xM_y(PO_4)_zF_n$ with (M=V, Fe, Mn, Ni, Co, Ti or combination of these metals); fluorophosphates such as $Na_2MP_4F$ or $Na_3(VO_x)_2(PO_4)_2F_{3-2x})$ wherein M=Fe, Co, Mn or combination of these metals; sulfates such as $Na_2Fe_2(SO_4)_3$ and $Na_2Fe(SO_4)_2 \cdot 2H_2O$; transition metal layered oxides of the formula $Na_xMO_2$ wherein M=Mn, Co, Fe, Ni, Ti, Mg, B, Cr, Al, Sb or combination of these metals; metal hexacyanometalates of the formula $A_xMM'(CN)_6$ wherein A=Na or K and M and M' are selected from Fe, Co, Mn, and Ni.

In the case of a Mg-ion battery, the negative electrode active materials may, for instance, be selected from $Li_4Ti_5O_{12}$, Sb, Sn, and Bi.

In the case of a Mg-ion battery, the positive electrode active materials may, for instance, be selected from $TiSe_2$; $V_2O_5$; $Mo_6S_8$; $Mo_6Se_8$; $MoS_2$; $MoO_3$; Prussian blue analogs such as $M_3^{II}[Co^{III}(CN)_6]_2 \cdot nH_2O$ wherein M is Co or Mn; Manganese oxides such as $Mn_2O_3$, $Mn_3O_4$, Tunneled $MnO_2$, and Layered $MnO_2$(birnessite); transition metal silicates such as $Li_2MSiO_4$ wherein M is a transition metal; $Co_3O_4$; and $RuO_2$.

The composition preferably comprises from 60 to 80 wt % positive or negative electrode active material on a dry weight basis, i.e. when the weight of eventual solvents is not taken into consideration.

The mass ratio between the at least partially hydrolysed polyvinyl acetate component and the positive or negative electrode active component equals at least 0.12 and at most 0.30, and the mass ratio between the polyalkylene glycol component and the positive or negative electrode active component equals at least 0.012 and at most 0.10, preferably at most 0.06.

In embodiments, the mass ratio between the polyalkylene glycol component and the positive or negative electrode active component may be equal to:
at least the largest of 0.012 and −0.0002 Mn+2.6, and
at most the smallest of 0.30 and −0.0012 Mn+10.6.

These relations take into account a variation of what constitutes an adequate ratio of polyalkylene glycol and electrode active component in function of the Mn of the polyalkylene glycol component.

Preferably, the mass ratio between the polyalkylene glycol component and the positive or negative electrode active component equal at most the smallest of 0.30 and −0.0004 Mn+5.6.

The composition comprises a conductive component. The conductive component is either a single conductive material or a mixture of conductive materials.

The conductive materials may be any conductive material. They are preferably selected from carbon allotropes such as but not limited to carbon black, carbon nanotubes, and graphene.

In embodiments, the conductive component may be present in an amount of from 1 to 40 wt %, preferably from 1 to 30 wt %, more preferably from 1 to 20 wt % with respect to the mass of the positive or negative electrode active component.

In embodiments, the composition may further comprise a dispersant for dispersing the conductive component. The dispersant is preferably suitable for dispersing the conductive component in the intended solvent (e.g. in water). It is typically a surface-active species, soluble in the intended solvent, which adsorb onto the particle surfaces The dispersant may, for instance, be selected from polyethylene imine-based polyelectrolytes (e.g. polyethylene imine), octylphenoxypolyethoxyethanol, (meth)acrylic acid-based polymeric polyelectrolytes, oxy-silane esters, and phosphate esters amongst others. The conductive materials and the electrode active materials are often obtained (e.g. purchased) with a deflocculating agent. In embodiments, this deflocculating agent can be the dispersant used in the present invention.

In embodiments where a dispersant is present, it may be present in an amount of from 0.1 to 6 wt % with respect to the mass of the positive or negative electrode active component on a dry weight basis.

The dispersant, when present, stabilizes the dispersions based on the composition by preventing the conductive component and the active material from precipitating and/or agglomerating.

The use of a dispersant is particularly advantageous when a liquid dispersion with a relatively low solid content is desired, for instance when a liquid dispersion with a solid content of 15 wt % or lower is desired.

Preferably, the composition of the present invention does not comprise a cellulose derivative or comprises not more than 1 wt % cellulose derivative with respect to the mass of the positive or negative electrode active component on a dry weight basis. Cellulose derivatives tend to make the films less flexible and more brittle and to allow a worse encapsulation of the electrode active component and the conductive component.

Preferably, the composition of the present invention does not comprise polymers that are not water-soluble or comprises not more than 1 wt % of such polymers.

Preferably, the composition of the present invention does not comprise thermosetting resins or comprises not more than 1 wt % of such resins.

Preferably, the composition of the present invention does not comprise an elastomer or comprises not more than 1 wt % of elastomers.

Preferably, the composition of the present invention does not comprise a halogenated polymer or comprises not more than 1 wt % of halogen polymers.

Most preferably, the composition of the present invention comprises no cellulose derivatives, no polymers that are not water-soluble, no thermosetting resins, no elastomers and no halogenated polymers.

In an embodiment, the composition according to the first aspect may comprise on a dry weight basis:
a. from 8.4 to 21 wt % of an at least partially hydrolysed polyvinyl acetate component having an hydrolysation degree of at least 5%,
b. from 0.8 to 7 wt % of a polyalkylene glycol component having a number average molecular mass Mn lower than 9000 g/mol and consisting of one or more substances selected from the group consisting of polyethylene glycol, polypropylene glycol, copolymers of ethylene glycol and propylene glycol, and their esters.
c. from 60 to 80 wt % of a positive or negative electrode active component,
d. from 0.7 to 28 wt % of a conductive component, and
e. from 0 to 4.2 wt % of a dispersant,
wherein the mass ratio between the at least partially hydrolysed polyvinyl acetate component and the positive or negative electrode active component equal at least 0.12 and at most 0.30, and
wherein the mass ratio between the polyalkylene glycol component and the positive or negative electrode active component equal at least 0.012 and at most 0.10.

In preferred embodiments, components a, b, c, d, and e sum up to 100 wt % on a dry weight basis.

In a second aspect, the present invention relates to a liquid suspension comprising:
a. One or more solvents selected from water, methanol, ethanol, and propanol, and
b. A composition according to any embodiment of the first aspect.

Preferably, the liquid suspension does not comprise other solvents than these one or more solvents selected from water, methanol, ethanol, and propanol.

In this second aspect, the one or more solvents preferably comprises water, more preferably in a volume fraction of at least 50%. Most preferably, the one or more solvents is a single solvent and is water.

In embodiments, the dry weight of the liquid suspension, i.e. its weight discounting the solvents, may be equal to from 0.1 to 60 wt % of the total weight of the liquid suspension. Preferably, it is equal to from 2 to 30 wt %, more preferably from 5 to 20 wt % and most preferably from 10 to 14 wt %.

In embodiments, the liquid suspension may have a zeta potential of at least 30 mV, more preferably at least 40 mV and most preferably at least 50 mV in absolute value.

In a third aspect, the present invention relates to a method for forming a liquid suspension according to any embodiment of the second aspect, comprising contacting one or more solvents selected from water, methanol, ethanol, and propanol with each component of a composition according to any embodiment of the first aspect.

The liquid suspension is typically prepared by mixing the electrode active component with the one or more solvents (preferably water) in the presence of the conductive component, the optional dispersant, the at least partially hydrolysed polyvinyl acetate component and the polyalkylene glycol component. A preliminary step may consist in reducing the size of the particles of the electrode active material in order that the maximum size (nanometric, submicronic or micronic size) of the positive or negative active material is not larger than the mean film thickness one wish to deposit. The size of the particles will also depend on the deposition technique used for preparing the film. This size reduction may be achieved by ball-milling the powder in the one or more solvents (e.g. in water). The different additives may then be added successively to this suspension of electrode active component until the desired solid loading is reached.

In a fourth aspect, the present invention relates to a film having a composition according to any embodiment of the first aspect.

Typically, the film according to the third aspect is crack-free and intrinsically flexible. By intrinsically flexible, it is meant that it is flexible even when not supported by a substrate such as a flexible substrate.

Typically, the film according to the third aspect is homogeneous.

Typically, the film according to the third aspect is non-porous. Typically, no porogenic agent is used in the formation of the film.

In embodiments, the film of the third aspect may have a thickness of from 200 nm to 100 µm, preferably from 200 nm to 50 µm.

Surprisingly, the presence of the non-conductive polymers in the film (at least partially hydrolysed PVAc and PEG) does not substantially affect its electrochemical properties, the conductivity in the film is still good even if the polymers are not conductive. Also, the rate capability and the capacities of the films are good by comparison to what is generally reached for the electroactive material with electrode preparation processes of the prior art.

In a fifth aspect, the present invention relates to a process for forming a film according to any embodiment of the fourth aspect, comprising applying a liquid suspension according to any embodiment of the second aspect on a substrate.

This film is typically obtained from the deposition of the liquid suspension according to any embodiment of the second aspect on a substrate optionally followed by removing the film from the substrate.

The liquid composition may be deposited on a substrate by any known deposition method such as for example tape casting or spraying, such as ultrasonic spraying, on a substrate (metallic or not metallic). In embodiments, the substrate can be a conductive substrate such as copper, aluminium, steel, stainless steel, conductive glass, which can be used as a counter electrode. The substrate is advantageously flexible. The film can alternatively be peeled off the substrate to obtain an active material film without any substrate. In this last case, a non-metallic substrate such as glass is preferred.

In a sixth aspect, the present invention relates to an electrode comprising a film according to any embodiment of the fourth aspect.

In embodiments, the electrode may be the film according to any embodiment of the fourth aspect, without a substrate. In other embodiments, the electrode may be composed of a substrate and a film according to any embodiment of the fourth aspect coated thereon. The substrate is preferably a flexible substrate. A flexible substrate has the advantage of keeping the electrode flexible.

In a seventh aspect, the present invention relates to a battery comprising the electrode according to any embodiment of the sixth aspect.

In embodiments, the battery is flexible. This is made possible by the flexible nature of the film according to the fourth aspect.

In embodiments, the battery is a Li-ion, a Na-ion or a Mg-ion battery. The films according to the fourth aspect of the present invention are particularly suitable for use in such batteries.

General Procedure for Preparing the Suspensions $Li_4Ti_5O_{12}$ (LTO) powder was obtained as follows. $TiO_2$ (Degussa P25) was dispersed in water (10 wt. %) in the presence of a stabilizer, Duramax D-3005 (Dow) with relative ratio $TiO_2$:Duramax=100:3. $LiOH.H_2O$ (Alfa Aesar, 98+%) was added in stoichiometric ratio (Ti:Li=4:5). This slurry containing all precursors was stirred until homogeneity and then injected into a spray-dryer (Mobile Minor GEA) with an inlet temperature of 190° C., an outlet temperature of 110° C., a pressure of 5 bars and a flow rate of 25 mL/min. The obtained powder was then calcined for 2 h at 850° C. at 100° C./h.

$Li_4Ti_5O_{12}$ (LTO) suspensions were prepared by first ball-milling the LTO powder in water for 1 hour at 300 rpm. The concentration of LTO in the suspension was 33 wt. % and the size of the particles after milling was about 600 nm (primary particles) as measured by laser diffraction granulometry with a laser diffraction particle sizer Malvern 2000, in aqueous media, without ultrasonic steering by measuring d0.5, i.e. the size below which 50% of the particles lie. The stability of the LTO aqueous suspension was confirmed by a zeta potential of −52.75 mV. The zeta potential was measured by Zeta potential-meter Quantachrome DT1200 without any dilution of the suspensions. Then, carbon black (Cb, Alpha Aesar, 50% compressed), polyethyleneimine (PEI, branched Mw=25000, Mn=10000, Sigma Aldrich), polyvinyl acetate partially hydrolyzed (copolymer PVAc/PVOH=27.5/72.5 (mol %), Mw of about 52000 g/mol and Mn about 22000 g/mol, Tg of 64° C.; Synthomer) and polyethylene glycol (PEG, Mn=500, Tg of −60° C. (Clariant GmbH) or 6000 g/mol, Tg of −23° C. (from Merck for synthesis)) were added with the following relative mass ratio: LTO/Cb/PEI/PVAc partially hydrolyzed/PEG=100/20/0.3/x/y for forming a 12 wt % suspension, with x=10 or 20 and 0≤y≤5.

Other examples were done with the following composition: LTO/Cb/PEI/PVAc not hydrolized/PEG=100/20/0.3/20/y, for forming a 12 wt % suspension with y=0 or 3.

area is about 10×20 cm². If deposited on glass, the obtained films were removed from the substrate. The films were used without any pressing.

Electrochemical Measurements

The electrochemical measurements were performed in Swagelok® cells with a Multichannel Potentiostat/galvanostat Bio-Logic VMP3 in a voltage window of 2.5-1 V with different cycle rates for $Li_4Ti_5O_{12}$ and a voltage window of 4.2-2 V for $LiFePO_4$. The counter electrode was in metallic lithium, the electrolyte was $LiPF_6$ 1 M in ethylene carbonate: dimethyl carbonate (1:1 in volume), the separator consisted of a polypropylene membrane. The assembly of the cell was done in a gloves box. Before the assembling, the LTO films were set at 110° C. under vacuum for 12 h to remove the possibly adsorbed water.

Mechanical Measurements

The flexibility of the films was characterized by the mechanical measurements film tension clamp mode at ambient temperature. The films were cut into 10 mm strips to fit the DMA (Dynamic Mechanical Analysis) film/fiber tension clamp configuration. A constant controlled axial force of 1 N in tension was used during the experiments. A webcam was used to capture images within the software and was used to eventually confirm failure within the films.

Preparation of the Films with Various Suspensions Compositions

TABLE 1

Suspensions compositions of examples 1-13. The values correspond to the wt % and are relative to the LTO mass: LTO/Cb/PEI/PVAc partially hydrolyzed or not/PEG = 100/20/0.3/x/y.

| Example | PVAc* | PVAc/PVOH** (=27.5/72.5) | CB | PEI | PEG 500 | PEG 6000 | Viscosity (mPa · s)*** | Film quality |
|---|---|---|---|---|---|---|---|---|
| 1 | — | 20 | 20 | 0.3 | — | — | 22.23 | bad |
| 2 | — | 20 | 20 | 0.3 | 1 | — | 21.10 | bad |
| 3 | — | 20 | 20 | 0.3 | 2 | — | 21.08 | bad |
| 4 | — | 20 | 20 | 0.3 | 3 | — | 14.56 | good |
| 5 | — | 20 | 20 | 0.3 | 4 | — | 13.70 | good |
| 6 | — | 20 | 20 | 0.3 | 5 | — | 13.33 | good |
| 7 | — | 20 | 20 | 0.3 | — | 1 | 17.27 | bad |
| 8 | — | 20 | 20 | 0.3 | — | 2 | 12.90 | good |
| 9 | — | 20 | 20 | 0.3 | — | 4 | 26.18 | bad |
| 10 | — | 20 | 20 | 0.3 | — | 5 | 29.25 | bad |
| 11 | — | 10 | 20 | 0.3 | 3 | — | 21.28 | bad |
| 12 | 20 | — | 20 | 0.3 | — | — | 9.38 | — |
| 13 | 20 | — | 20 | 0.3 | 3 | — | 9.59 | bad |

*Water-dispersible polymer.
**Water-soluble polymer.
***With a shear rate of 100 s⁻¹

PVAc (not Hydrolyzed) was Synthesized as Follow:

$NaHCO_3$ (0.06 g, Sigma Aldrich) was dissolved in water (2 mL). K2S2O8 (0.066 g, Sigma Aldrich) was dissolved in water (3 mL). In a 250 mL flask, 10 mL of a sodium dihexyl sulfosuccinate (AMA, 25 g/L) and 20 mL of a polyvinyl alcohol solution (PVOH, Mowiol, 88% hydrolyzed, 100 g/L) were introduced. Then, 15 mL of vinyl acetate were added. The mixture was vigorously stirred (300 rpm) for one minute with a magnetic stirrer. Successively, the $NaHCO_3$ solution and K2S2O8 solution were added to the flask. The flask was put under pressure. The mixture was stirred at 60° C. for 15 h.

Preparation of the Films

The suspensions were tape casted on Cu, Al, glass or metallized Mylar® sheets using an automatic Doctor Blade with a gap of 300 μm and a rate of 2 cm/sec. The deposited Example 1 (Comparative)

$Li_4Ti_5O_{12}$ (LTO) suspensions were prepared by first ball-milling the LTO powder in water for 1 hour at 300 rpm. The concentration of LTO in the suspension was 33 wt. % and the size of the particles after milling was about 600 nm (primary particles). Then, carbon black (Cb), PEI, and a PVAc hydrolyzed at 72.5% (Mw of about 52000 g/mol, Mn of about 22000 g/mol) were added with the following mass ratio: LTO/Cb/PEI/partially hydrolyzed PVAc=100/20/0.3/20 for forming an about 12 wt % suspension. The suspension had a shear thinning behavior. The viscosity of the suspension was 22.23 mPa·s at a shear rate of 100 s⁻¹ at room temperature. The suspensions were tape casted on metallized Mylar® sheets using an automatic Doctor Blade with a gap of 300 μm and a rate of 2 cm/sec. The deposited area was about 10×20 cm². The obtained film contained cracks and was not flexible (FIG. 1a).

Example 2 (Comparative)

The same composition as in example 1 was prepared except that PEG with Mn of about 500 g/mol was added with the following mass ratio: LTO/Cb/PEI/partially hydrolyzed PVAc/PEG=100/20/0.3/20/1 for forming an about 12 wt % suspension. The suspension had a shear thinning behavior. The viscosity of the suspension was 21.10 mPa·s at a shear rate of 100 s$^{-1}$. The suspension was tape casted as in example 1. The obtained film contained cracks and was not flexible.

Example 3 (Comparative)

The same composition as in example 2 was prepared except that PEG amount was increased to obtain the following mass ratio: LTO/Cb/PEI/partially hydrolyzed PVAc/PEG=100/20/0.3/20/2 for forming about 12 wt % suspension. The suspension had a shear thinning behavior. The viscosity of the suspension was 21.08 mPa·s at a shear rate of 100 s$^{-1}$. The suspension was tape casted as in the previous example. The obtained film contained cracks and was not flexible (FIG. 1b).

Example 4 (Embodiment)

Figure 4:
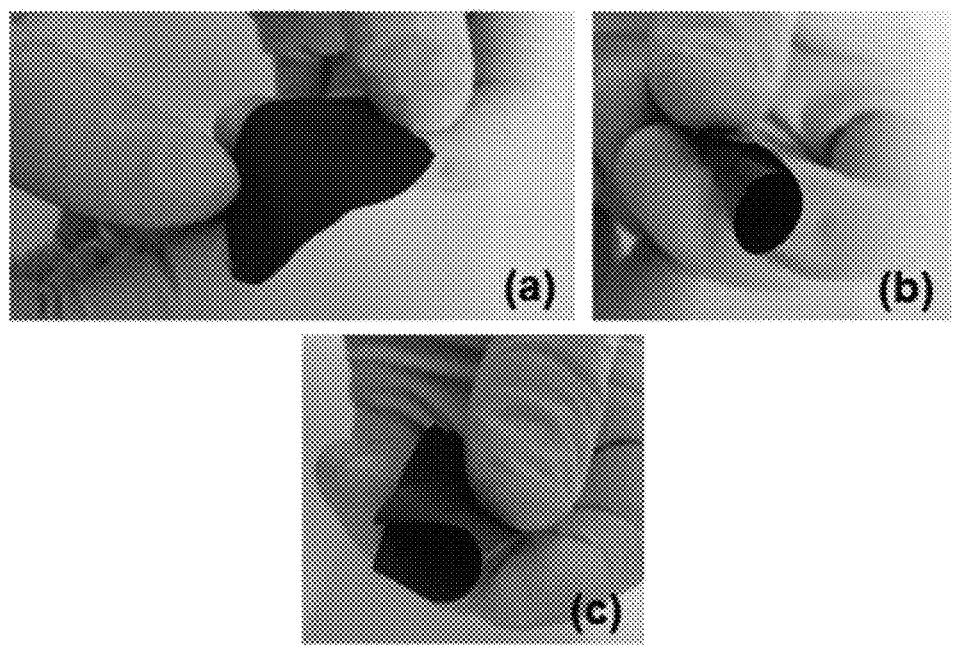
FIG. 4 shows pictures of films according to example 4 of the present invention. Pictures (a), (b), and (c) were taken directly after peeling off a glass substrate.

The same composition as in example 3 was prepared except that PEG amount was increased to obtain the following mass ratio: LTO/Cb/PEI/partially hydrolyzed PVAc/PEG=100/20/0.3/20/3 for forming about 12 wt % suspension. The suspension had a shear thinning behavior. The viscosity of the suspension was 14.56 mPa·s at a shear rate of 100 s$^{-1}$. The suspension was tape casted as in the previous example. Other samples were performed on non-conductive glass and on copper sheets. The obtained films were crack-free and flexible, even once peeled off the glass substrate (FIG. 1 c and FIG. 4 a). Without being bound by theory, we hypothesize that the respective amounts of partially hydrolyzed PVAc and PEG (Mn of 500 g/mol) were adequate to trigger a synergic effect between the PEG and the partially hydrolyzed PVAc.

Example 5 (Embodiment)

The same composition as in example 4 was prepared except that PEG amount was increased to obtain the following mass ratio: LTO/Cb/PEI/partially hydrolyzed PVAc/PEG=100/20/0.3/20/4 for forming about 12 wt % suspension. The suspension had a shear thinning behavior. The viscosity of the suspension was 13.70 mPa·s at a shear rate of 100 s$^{-1}$. The suspension was tape casted as in the previous example. The obtained films were crack-free and flexible. Without being bound by theory, we hypothesize that the amount of PEG (Mn of 500 g/mol) was adequate to trigger a synergic effect with the binding properties of the partially hydrolyzed PVAc.

Example 6 (Embodiment)

The same composition as in example 5 was prepared except that PEG amount was increased to obtain the following mass ratio: LTO/Cb/PEI/partially hydrolyzed PVAc/PEG=100/20/0.3/20/5 for forming about 12 wt % suspension. The suspension had a shear thinning behavior. The viscosity of the suspension was 13.33 mPa·s at a shear rate of 100 s$^{-1}$. The suspension was tape casted as in the previous example. The obtained films were crack-free and flexible. Without being bound by theory, we hypothesize that the amount of PEG (Mn of 500 g/mol) was adequate to trigger a synergic effect with the binding properties of the partially hydrolyzed PVAc.

Example 7 (Comparative)

The same composition as in example 1 was prepared except that PEG with Mn of about 6000 g/mol was added to obtain the following mass ratio: LTO/Cb/PEI/partially hydrolyzed PVAc/PEG=100/20/0.3/20/1 for forming an about 12 wt % suspension. The suspension had a shear thinning behavior. The viscosity of the suspension was 17.27 mPa·s at a shear rate of 100 s$^{-1}$. The suspension was tape casted as in the previous example. The obtained film contains cracks and was not flexible.

Example 8 (Embodiment)

The same composition as in example 7 was prepared except that PEG amount was increased to obtain the following mass ratio: LTO/Cb/PEI/partially hydrolyzed PVAc/PEG=100/20/0.3/20/2 for forming an about 12 wt % suspension. The suspension had a shear thinning behavior. The viscosity of the suspension was 12.90 mPa·s at a shear rate of 100 s$^{-1}$. The suspension was tape casted as in the previous example. Other samples were performed on non-conductive glass. The obtained films were crack-free and flexible, even when peeled off the glass substrate (FIG. 1 d). Without being bound by theory, we hypothesize that the amount of PEG (Mn of 6000 g/mol) was adequate to trigger a synergic effect with the binding properties of the partially hydrolyzed PVAc.

Example 9 (Comparative)

The same composition as in example 8 was prepared except that PEG amount was increased to obtain the following mass ratio: LTO/Cb/PEI/partially hydrolyzed PVAc/PEG=100/20/0.3/20/4 for forming an about 12 wt % suspension. The suspension had a shear thinning behavior. The viscosity of the suspension was 26.18 mPa·s at a shear rate of 100 s$^{-1}$. The suspension was tape casted as in the previous example. The obtained film contained bubbles, it was not smooth and not flexible.

Example 10 (Comparative)

The same composition as in example 9 was prepared except that PEG amount was increased to obtain the following mass ratio: LTO/Cb/PEI/partially hydrolyzed PVAc/PEG=100/20/0.3/20/5 for forming an about 12 wt % suspension. The suspension had a shear thinning behavior. The viscosity of the suspension was 29.25 mPa·s at a shear rate of 100 s$^{-1}$. The suspension was tape casted as in the previous example. The obtained film contains bubbles, it was not smooth and it was not flexible (FIG. 1 e).

Example 11 (Comparative)

The same composition as in example 4 was prepared except that the hydrolyzed PVAc amount was decreased to obtain the following mass ratio: LTO/Cb/PEI/partially hydrolyzed PVAc/PEG=100/20/0.3/10/3 for forming an about 12 wt % suspension. The suspension had a shear thinning behavior. The viscosity of the suspension was 21.28 mPa·s at a shear rate of 100 s$^{-1}$. The suspension was tape casted as in the previous example. The film contained cracks and was not flexible (FIG. 1 f).

Example 12 (Comparative)

Figure 2:
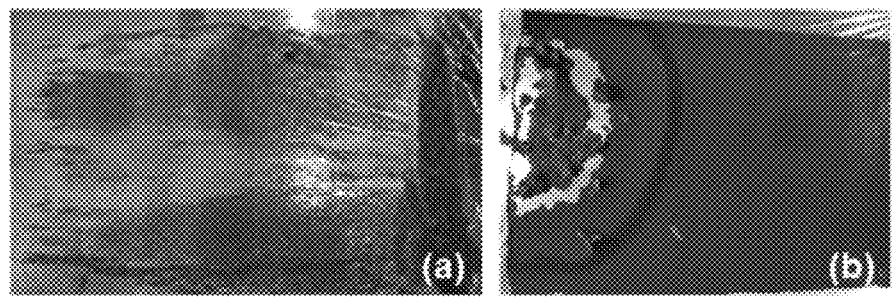
FIG. 2 shows pictures of films according to comparative examples 12 (a) and 13 (b).

The same composition as in example 4 was prepared except that PVAc was not hydrolyzed and no PEG was added to obtain the following mass ratio: LTO/Cb/PEI/PVAc/PEG=100/20/0.3/20/0 for forming an about 12 wt % suspension. The suspension had a shear thinning behavior. The viscosity of the suspension was 9.38 mPa·s at a shear rate of 100 s$^{-1}$. The suspension was tape casted as in the previous example. No film could be achieved. The suspension was not adherent to the substrate (FIG. 2 a).

Example 13 (Comparative)

The same composition as in example 4 was prepared except that PVAc was not hydrolyzed to obtain the following mass ratio: LTO/Cb/PEI/PVAc/PEG=100/20/0.3/20/3 for forming an about 12 wt % suspension. The suspension had a shear thinning behavior. The viscosity of the suspension was 9.59 mPa·s at a shear rate of 100 s$^{-1}$. The suspension was tape casted as in the previous example. The film contained cracks and was not flexible (FIG. 2 b).

Example 14 (Embodiment)

The same composition as in example 4 was prepared except that PVAc was less hydrolyzed (44.8% hydrolysis, Mw of about 27000 g/mol, Mn of about 12000, from Synthomer). The suspension had a shear thinning behavior. The viscosity of the suspension was 8.60 mPa·s at a shear rate of 100 s$^{-1}$. The suspension was tape casted on copper sheets using an automatic Doctor Blade with a gap of 300 µm and a rate of 2 cm/sec. The deposited area was about 10×20 cm$^2$. Other samples were performed on non-conductive glass. The obtained films were crack-free and flexible.

Example 15 (Embodiment)

The same composition as in example 4 was prepared except that PVAc was highly hydrolyzed (87.2% hydrolysis, Mw of about 37000 g/mol, reference Poval™ 6-88 from Kuraray). The suspension had a shear thinning behavior. The viscosity of the suspension was 10.9 mPa·s at a shear rate of 100 s$^{-1}$. The suspension was tape casted as in the previous example. The obtained films were crack-free and flexible.

Example 16 (Embodiment)

The same composition as in example 4 was prepared except that a PVAc hydrolyzed at 88.6% (Mw of about 160000 and Mn of about 65000 g/mol, from Synthomer) and a polypropylene glycol (Sigma-Aldrich, Mn of about 425 g/mol) were added with the following mass ratio: LTO/Cb/PEI/partially hydrolyzed PVAc/PPG=100/20/0.3/20/3 for forming about 12 wt % suspension. The suspension had a shear thinning behavior. The viscosity of the suspension was 25.2 mPa·s at a shear rate of 100 s$^{-1}$. The suspension was tape casted as in the previous example. The obtained films were crack-free and flexible.

Example 17 (Embodiment)

$Li_4Ti_5O_{12}$ (LTO) suspensions are prepared by first ball-milling for 1 hour at 300 rpm the LTO powder in water. The concentration of LTO in the suspension is 33 wt. % and the size of the particles after milling is about 600 nm (primary particles). Then, carbon black (Cb), PEI, a PVAc hydrolyzed at 72.5% (Mw of about 120000 g/mol) and a poly(ethylene glycol-ran-propylene glycol) monobutyl ether (Sigma-Aldrich, Mn of about 3900 g/mol) are added with the following mass ratio: LTO/Cb/PEI/partially hydrolyzed PVAc/P(EG-PG)=100/20/0.3/20/3 for forming about 12 wt % suspension. The suspension is tape casted on metallized Mylar® sheets using an automatic Doctor Blade with a gap of 300 µm and a rate of 2 cm/sec. The deposited area is about 10×20 cm$^2$. Other samples are performed on non-conductive glass.

Example 18 (Embodiment)

The same composition as in example 4 was prepared except that carbon black was partially substituted by graphene oxide (GO), from Graphenea (Graphene Oxide Water Dispersion 0.4 wt %) to obtain the following mass ratio: LTO/Cb/GO/PEI/partially hydrolyzed PVAc/PEG=100/19/1/0.29/20/3 for forming about 12 wt % suspension. The viscosity of the suspension was 18.26 mPa·s at a shear rate of 100 s$^{-1}$. The suspension was tape casted as in the previous example. The obtained films were crack-free and flexible.

Example 19 (Embodiment)

$LiFePO_4$ particles (1 µm, from Prayon) were suspended in water. The concentration of $LiFePO_4$ in the suspension was 33 wt. %. Then, carbon black (Cb), PEI, a PVAc hydrolyzed at 87.2% (Mw of about 37000 g/mol, Poval™ 6-88 from Kuraray) and PEG (Mn of about 500 g/mol) were added with the following mass ratio: $LiFePO_4$/Cb/PEI/partially hydrolyzed PVAc/PEG=100/20/0.3/20/3 for forming about 12 wt % suspension. The suspension was tape casted on aluminum sheets using an automatic Doctor Blade with a gap of 300 µm and a rate of 2 cm/sec. The deposited area was about 10×20 cm$^2$. Other samples were performed on non-conductive glass. The obtained films were crack-free and flexible.

Example 20 (Embodiment)

The same composition as in example 4 was prepared except that carbon black was partially substituted by carbon nanotubes (CNT) with the following mass ratio: LTO/Cb/CNT/PEI/partially hydrolyzed PVAc/PEG=100/15/5/0.23/20/3. The viscosity of the suspension was 17.38 mPa·s at a shear rate of 100 s$^{-1}$. The suspension was tape casted on copper sheets using an automatic Doctor Blade with a gap of 300 µm and a rate of 2 cm/sec. The deposited area was about 10×20 cm$^2$. The obtained films were crack-free and flexible.

Example 21 (Embodiment)

The same composition as in example 4 was prepared except that carbon black was partially substituted by carbon nanotubes (CNT) and the total amount of carbon was reduced with the following mass ratio: LTO/Cb/CNT/PEI/partially hydrolyzed PVAc/PEG=100/9/1/0.14/20/3 for forming about 17 wt % suspension. The suspension had a shear thinning behavior. The viscosity of the suspension was 14.78 mPa·s at a shear rate of 100 s$^{-1}$. The suspension was tape casted as in the previous example. The obtained films were crack-free and flexible.

Example 22 (Embodiment)

The same composition as in example 4 was prepared except that a PVAc hydrolyzed at 88.6% (Mw of about 160000 g/mol, Mn of about 65000 g/mol) was used. The viscosity of the suspension was 14.56 mPa·s at a shear rate of 100 s$^{-1}$. The suspension was then spray-dried in a Niro Mobile Minor spray-dryer in order to prepare a homogeneous powder with all suspension components. The particle size of the collected powder was 65.42 μm. The total carbon content (polymers and Cb) was measured by a carbon analyzer analytikjena multi EA 4000 and was 23.4%. The loss of carbon (e.i. Cb and polymers) during the spray-drying step is low. The powder was then put in water to obtain a 12 wt. % suspension. The suspension was tape casted as in the previous example. The obtained films were crack-free and flexible. The spray-drying step did not affect the properties of the mixture and allowed the preparation a homogeneous mixed powder containing LTO, Cb, and polymers.

Example 23 (Embodiment)

The same dry composition as in previous example was prepared. The powder was then put in water to obtain a 50 wt. % suspension. The suspension was tape casted as in previous example. The obtained films were crack-free and flexible. The spray-drying step allowed the preparation a homogeneous mixed powder containing LTO, Cb, and polymers. It allowed also to increase the mass content in the suspension and did not affect the properties of the mixture.

Characterization of the Films

Characterization 1: SEM

Figure 3:
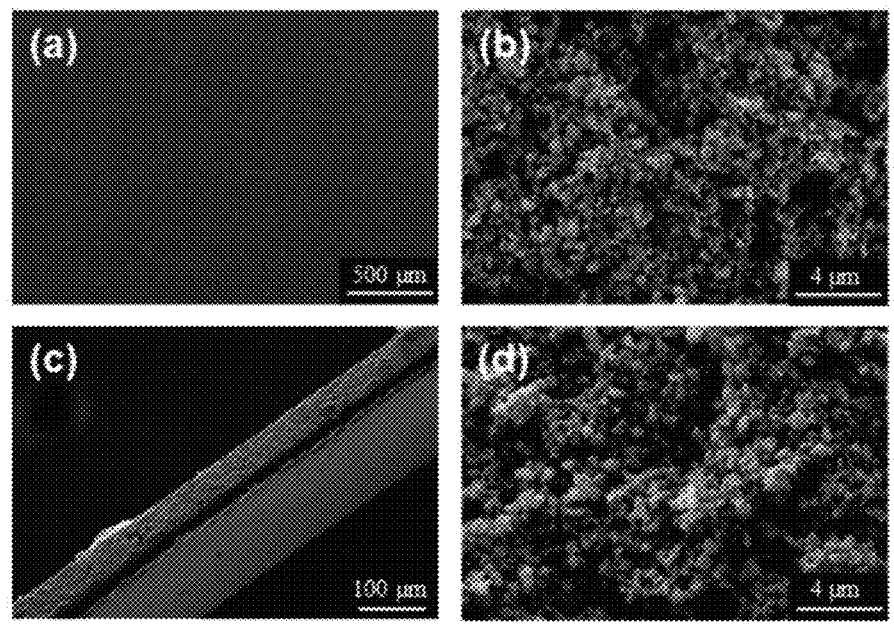
FIG. 3 (a,b) shows SEM of a film main surface at different magnitudes according to example 4 of the present invention.

In all of these examples, even if not flexible and/or contain cracks, films are homogenous. As they are similar from a microstructural point of view, only micrographs of some of them are presented (FIG. 3). $Li_4Ti_5O_{12}$ and carbon particles were well dispersed into all films which is advantageous to ensure a good electronic conductivity. The thickness of the particles did not exceed the one of the films. In the previous examples, the thickness of the films was comprised between 10 and 40 μm.

Characterization 2: Electrochemical Measurements

Electrochemical measurements were performed on films resulting from the examples 4 and 8. These films were chosen because they contained the minimum PEG concentration necessary for the flexibility. The analyzed films contained about 70 wt % LTO. They contain a mass ratio LTO/Cb/PEI/partially hydrolysed PVAc/PEG of 100/20/0.3/20/2. They were peeled off glass and then the electrochemical measurements were performed in Swagelok® cells with a Multichannel Potentiostat/galvanostat BioLogic VMP3 in a voltage window of 2.5-1 V for examples with $Li_4Ti_5O_{12}$ and 4.2-2V for example with $LiFePO_4$ with different cycle rates. The counter electrode was in metallic lithium, the electrolyte was $LiPF_6$ 1M in ethylene carbonate:dimethyl carbonate (1:1 in volume), the separator consisted of a polypropylene membrane. The assembly of the cell was done in a gloves box. Before the assembling, the LTO films were put at 110° C. under vacuum for 12 h to remove the eventual adsorbed water.

Figure 5:
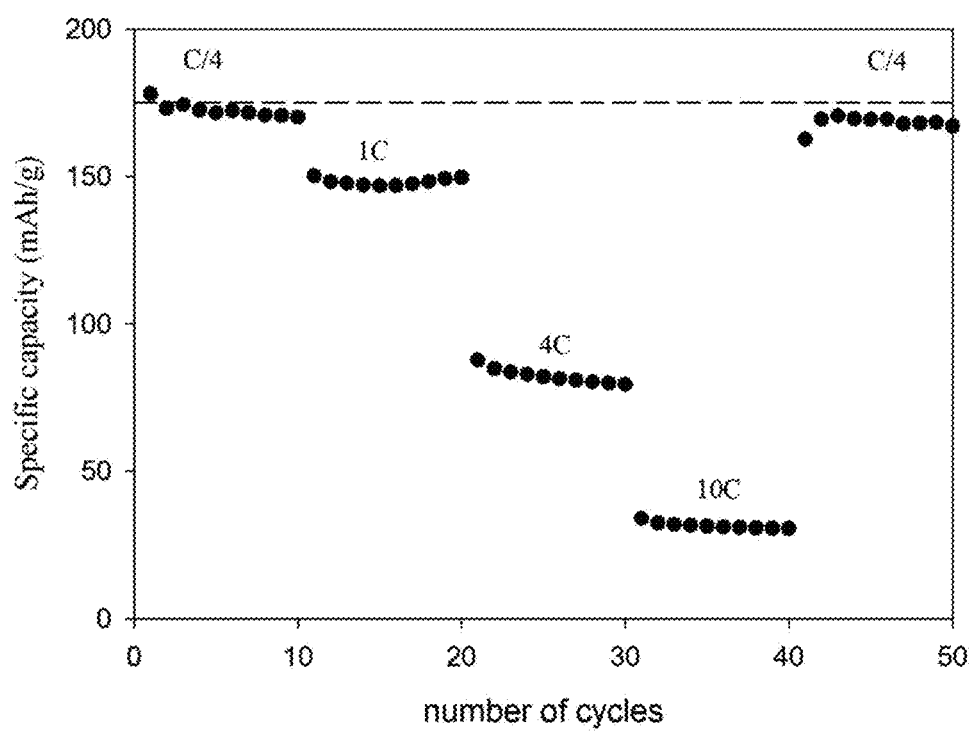
FIG. 5 is a graph plotting the specific capacity of a film according to example 8 of the present invention in function of the number of cycles for different cycling rates.

The results were the same for both samples and only the results corresponding to example 4 are shown in FIG. 5. The chain length of the PEO did not influence the electrochemical performances (FIG. 5). For a low rate of C/4, which corresponds to the complete charge/discharge of the cell in 4 h, the specific capacity reached nearly 100% of the theoretical capacity. At 1 C, which corresponds to the complete charge/discharge of the cell in 1 h, the capacity was 145 mAh/g (85% of the theoretical capacity). A large diminution was observed for higher cycling rate (4 C which corresponds to the complete charge/discharge of the cell in 15 min and 10 C which corresponds to the complete charge/discharge of the cell in 6 min). Without being bound by theory we believe this is because only the particles from the surface had time to take part in the charge/discharge process. Finally, when a cycling rate of C/4 was applied again, the specific capacity returned to its initial value. This observation proves the excellent rate capability of our films.

Characterization 3: Mechanical Tests

The flexibility of films of examples 4 and 8 was characterized by the mechanical measurements film tension clamp mode at ambient temperature. The films were first peeled off the glass substrate (FIGS. 4 a, b and c) and then cut into 10 mm strips to fit the DMA film/fiber tension clamp configuration. A constant controlled axial force of 1 N in tension was used during the experiments. A webcam was used to capture images within the software and could be used to confirm failure within the films.

Table 2 shows the resulting results of the mechanical tension tests. Both samples had similar initial plateau length (oscillation strains values for both samples were close to each other) but the sample containing PEG 6000 had to be deformed more to reach actual failure, indicated by a dramatic drop in modulus values. The failures were confirmed by webcam images. Based on these mechanical measurements, the PEG 6000 allowed to get a more robust film than PEG 500, meaning that PEG 6000 allowed to get a more flexible electrode.

TABLE 2

Mechanical tension tests on flexible based $Li_4Ti_5O_{12}$ films containing a co-binder: polyethylene glycol 500 g/mol or 6000 g/mol. Mean values at inflection point and at the films rupture.

|  | At inflection point | | At the films rupture | |
| --- | --- | --- | --- | --- |
|  | Example 4 | Example 8 | Example 4 | Example 8 |
| Oscillation strain $\bar{\varepsilon}$ (%) | 9 10$^{-2}$ | 1 10$^{-1}$ | 1.1 10$^{-1}$ | 3.1 10$^{-1}$ |
| Storage modulus E' (Pa) | 2 10$^8$ | 2.9 10$^8$ | 4.5 10$^8$ | 9 10$^8$ |
| Elastic modulus E'' (Pa) | 5.2 10$^8$ | 2.1 10$^9$ | 1.8 10$^8$ | 1.7 10$^8$ |

Characterization 4: Aging

The films obtained in examples 4-6 and 8 were stored under ambient atmosphere at room temperature for two years. A visual comparison of the films before and after the two years period indicates that no changes occurred for the films of examples 4-6 and that a slight degradation of the film structure occurred for the film of example 8.

It is to be understood that although preferred embodiments, specific constructions and configurations, as well as materials, have been discussed herein for devices according to the present invention, various changes or modifications in form and detail may be made without departing from the scope of this invention. For example, any formulas given above are merely representative of procedures that may be used. Steps may be added or deleted to methods described within the scope of the present invention.

The invention claimed is:

1. A composition comprising:
    (a) an at least partially hydrolysed polyvinyl acetate component having an hydrolysation degree of at least 5%;
    (b) polyalkylene glycol component consisting of one or more substances selected from the group consisting of polyethylene glycol, polypropylene glycol, copolymers of ethylene glycol and propylene glycol, and their derivatives;
    (c) a positive or negative electrode active component; and
    (d) a conductive component;
    wherein the mass ratio between the at least partially hydrolysed polyvinyl acetate component and the positive or negative electrode active component equals at least 0.12 and at most 0.30; and
    wherein the polyalkylene glycol component has a number average molecular mass Mn of from 300 to 7000 g/mol and wherein the mass ratio between the polyalkylene glycol component and the positive or negative electrode active component equals
        at least the largest of 0.012 and ($-0.0002$ Mn$+2.6$)/100, and
        at most the smallest of 0.30 and ($-0.0012$ Mn$+10.6$)/100,
        wherein Mn is the number average molecular mass of the polyalkylene glycol component, and
        wherein the composition is for forming a suspension.

2. The composition according to claim 1, wherein the at least partially hydrolysed polyvinyl acetate component has an hydrolysation degree of from 40 to 99%.

3. The composition according to claim 1, wherein the polyalkylene glycol component is a polyethylene glycol.

4. The composition according to claim 1, wherein the positive or negative electrode active component consists of particles having an average size inferior to 10 µm as measured by laser diffraction granulometry.

5. The composition according to claim 1, wherein the conductive component is present in an amount of from 1 to 40 wt % with respect to the mass of the positive or negative electrode active component.

6. The composition according to claim 1, further comprising a dispersant for dispersing the conductive component.

7. A liquid suspension comprising:
    (a) one or more solvents selected from water, methanol, ethanol and propanol, and
    (b) a composition according to claim 1.

8. The liquid suspension of claim 7, wherein solid content of the liquid suspension is 0.1 to 60 wt % of the weight of the liquid suspension.

9. A film having a composition comprising:
    (a) an at least partially hydrolysed polyvinyl acetate component having an hydrolysation degree of at least 5%;
    (b) polyalkylene glycol component consisting of one or more substances selected from the group consisting of polyethylene glycol, polypropylene glycol, copolymers of ethylene glycol and propylene glycol, and their derivatives;
    (c) a positive or negative electrode active component; and
    (d) a conductive component;
    wherein the mass ratio between the at least partially hydrolysed polyvinyl acetate component and the positive or negative electrode active component equals at least 0.12 and at most 0.30; and
    wherein the polyalkylene glycol component has a number average molecular mass Mn of from 300 to 7000 g/mol and wherein the mass ratio between the polyalkylene glycol component and the positive or negative electrode active component equals
        at least the largest of 0.012 and ($-0.0002$ Mn$+2.6$)/100, and
        at most the smallest of 0.30 and ($-0.0012$ Mn$+10.6$)/100,
        wherein Mn is the number average molecular mass of the polyalkylene glycol component.

10. The film according to claim 9, wherein the film is free of cracks and intrinsically flexible.

11. An electrode comprising the film according to claim 9.

12. A battery comprising the electrode according to claim 11.

* * * * *